Figure 1:
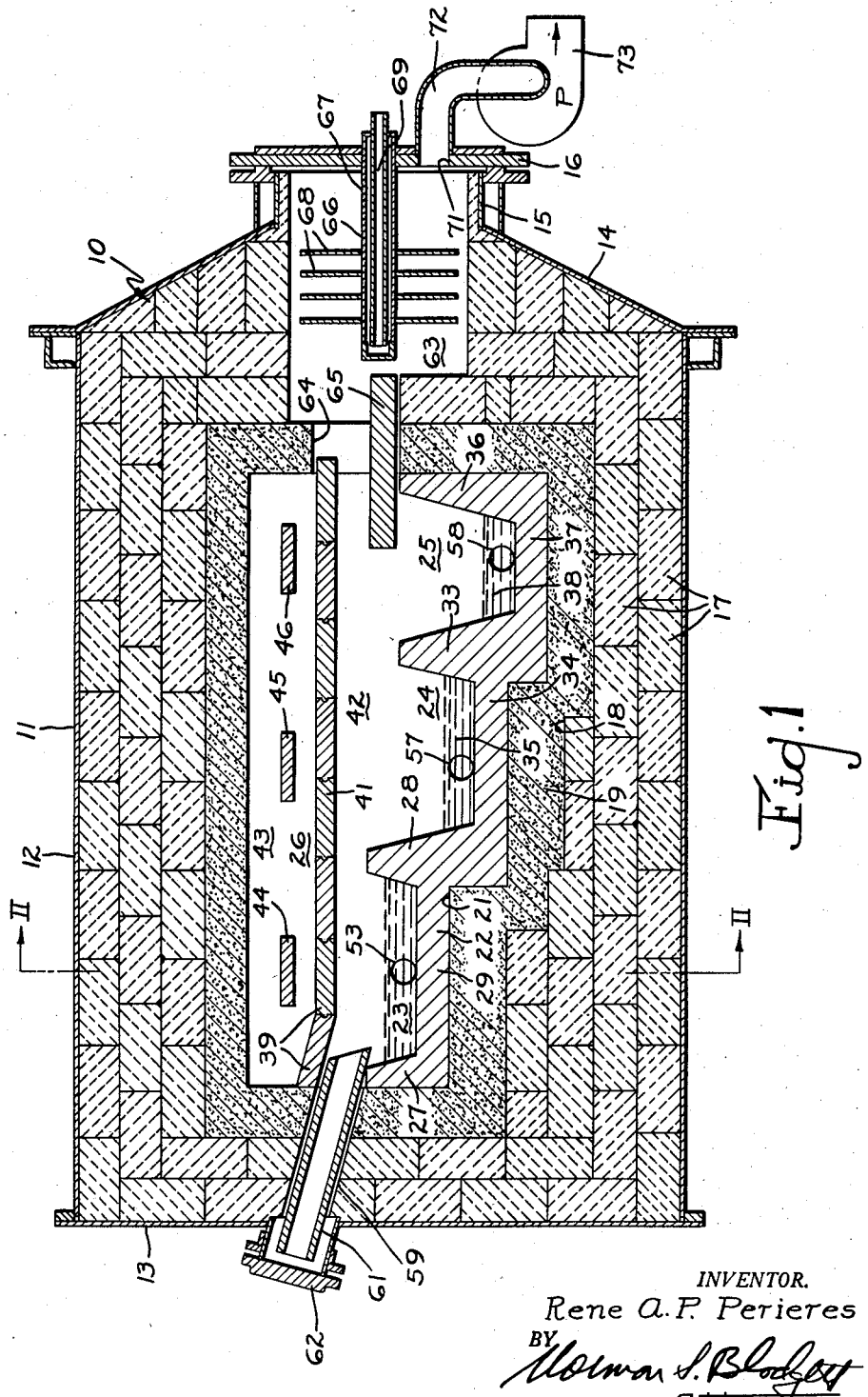

INVENTOR.
Rene A. P. Perieres

Nov. 11, 1958     R. A. P. PERIERES     2,859,958
APPARATUS FOR SEPARATING ALUMINUM FROM ITS ALLOYS
Filed June 21, 1956     2 Sheets-Sheet 2
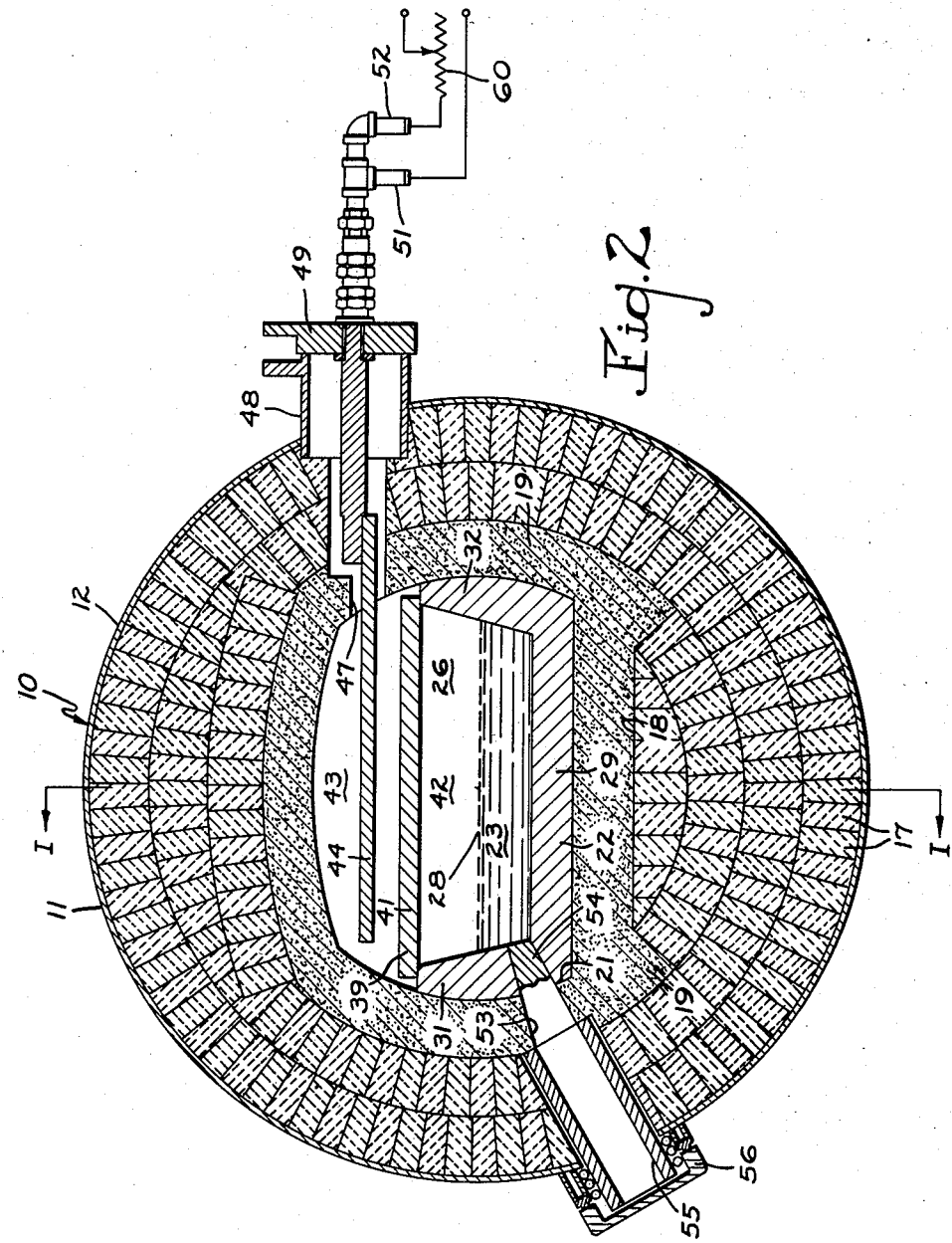
INVENTOR.
Rene A. P. Perieres
BY
Norman S. Blodgett
Attorney

United States Patent Office 2,859,958
Patented Nov. 11, 1958

2,859,958

APPARATUS FOR SEPARATING ALUMINUM FROM ITS ALLOYS

René A. P. Perieres, Grenoble, France, assignor to Pechiney, Paris, France, a corporation of France Application June 21, 1956, Serial No. 592,965

7 Claims. (Cl. 266—37)

This invention relates to an apparatus for separating aluminum from its alloys and more particularly to a furnace construction for use in purifying aluminum by a process of distillation.

This application is a continuation-in-part of patent application Serial Number 242,735, filed August 20, 1951, now abandoned.

Aluminum is produced industrially by the electrolytic treatment of alumina dissolved in molten cryolite. Most of the metals which are contained as impurities in the raw materials of this process, i. e., the alumina, the cryolite and the electrodes, are deposited at the cathode with the aluminum, thus contaminating it. It is necessary, therefore, if one wishes to obtain a commercially pure aluminum, to use only very pure raw materials, which are, of course, very expensive. It can be seen, then, that the use of such a process for obtaining pure aluminum can only be carried out in large plants involving a considerable investment. It has been realized that it would be very useful to evolve a process which would remove these drawbacks and which would provide a means of producing commercially pure aluminum from alloys and scrap without the necessity of treating the raw materials prior to the process. Since aluminum ores, such as bauxite and kaolin, usually contain silicon and iron as their principal impurities, it is possible to reduce these ores by heat only to the point where they contain 70% aluminum, the remainder being silicon and iron which cannot be removed by reduction. It has been suggested in the past that aluminum be manufactured by distillation from alloys, scrap and the like, the distillation to be carried out at a high temperature and under a high vacuum. Many attempts have been made to perfect such a process. However, for the most part, these endeavors have been unsuccessful. For one thing, the highly active volatilized aluminum destroys the apparatus and introduces foreign matter into the aluminum by attacking the walls chemically. No material which has been used has successfully avoided rapid corrosion and contamination of the product from this source. At the same time, no apparatus has been evolved which acted properly in segregating the aluminum from its impurities even for a short time. Furthermore, it has been found in some cases that the distilled aluminum collects in a mixed state composed of globules and crystals along with oxides. These and other difficulties experienced with prior art devices have been obviated by the present invention in a novel manner.

It is therefore an outstanding object of this invention to provide an apparatus for obtaining commercially pure aluminum by distillation.

Another object of the invention is the provision of an apparatus for the distillation of aluminum which will not deteriorate rapidly under the action of the molten aluminum.

It is a still further object of the invention to provide an apparatus which will properly segregate aluminum from its impurities through progressive stages of distillation.

Although the novel features which are believed to be characteristic of this invention will be particularly pointed out in the claims appended hereto, the invention itself, as to its objects and advantages, the mode of its operation and the manner of its organization may be better understood by reference to the following description taken in connection with the accompanying drawings forming a part thereof, in which:

Figure 1 is a vertical sectional view of an apparatus embodying the principles of the present invention, taken on the line I—I of Figure 2, and Figure 2 is a vertical sectional view of the apparatus taken on the line II—II of Figure 1.

In general, the present invention involves an aparatus manufacturing aluminum of commercial purity by the distillation of alloys and scrap at a high temperature under a high vacuum and also involves an apparatus for the practice of the distilling process which will withstand the action of liquid aluminum at the temperature and pressure used. As has been mentioned above, in a process of this type the liquide aluminum attacks any oxides with which it may come in contact and reduces them by forming oxides and volatile aluminum suboxides which yield an undesirable end product. The present invention contemplates the use of certain materials, principally carbides and nitrides of aluminum. These materials resist the action of liquid aluminum at high temperatures and vacuum. It has been noted, also, that aluminum in the vapor state does not appear to attack compacted graphite in any substantial manner, so that it is possible to use this material for parts of the apparatus which do not contact the liquid aluminum. In addition, silicon carbide appears to be a satisfactory material for use with liquid aluminum since, although it deteriorates rapidly at first, soon becomes more stable. It is felt that this is because the silicon carbide is converted at first into aluminum carbide, which is not effected greatly by the molten aluminum. It might be said, then, that, when the walls of the apparatus are constructed of silicon carbide, the actual surface contacted by the liquid aluminum is aluminum carbide. However, the silicon released before stabilization contaminates the condensate and it is, therefore, preferable to start with aluminum carbide in the first place.

For the purpose of the discussion which follows, it is well to bear in mind that the temperatures and corresponding pressures at which aluminum begins to distill lie on a curve passing through the following points:

Approximately 1240° C. under a vacuum of 0.03 mm. of Hg.

Approximately 1340° C. under a vacuum of 0.3 mm. of Hg.

Approximately 1400° C. under a vacuum of 0.5 mm. of Hg.

Approximately 1455° C. under a vacuum of 1.0 mm. of Hg.

Now, pure silicon distills at temperatures more than 100 to 150 degrees C. above the distillation temperature of pure aluminum within the above vacuum range. In the case of iron, the difference is even greater. Generally speaking, the lower the distillation temperature, the purer the metal produced, so that it can be seen that there is a distinct advantage to operation under a very high vacuum. The process contemplated with the apparatus of the invention consists, therefore, in separating silicon and iron from aluminum by a series of distillations each of which uses the condensate from the previous distillation. For alloys containing more than 20% silicon, three distillations are generally required, but the first distillation can be avoided by simply segregating the alloy in order to obtain a eutectic at approximately 13% silicon.

Referring to the drawings, the apparatus for separating aluminum from its alloys, indicated generally by the reference numeral 10, is shown as consisting of a generally elongated cylindrical furnace 11 arranged with its axis generally horizontal. The furnace comprises a tubular shell 12 formed of heavy gauge sheet steel having a flat transverse member 13 fastened to one end and a frusto-conical member 14 fastened to the other end. The small end of the member 14 has a short tubular extension 15 fastened thereto and terminating in a transverse member 16. The enclosure thus formed is lined with insulation in the form of bricks 17 to define a broadly cylindrical surface 18 which is coaxial with the shell 12. This surface is, in turn, provided with a thick layer 19 of mullite, the inside surface of this layer defining an inner surface 21 of generally cylindrical form. On the lower portion of the surface 21 rests a basin member 22 formed of aluminum nitride providing three basins 23, 24 and 25. The exposed upper surface of the basin member combines with the exposed portion of the surface 21 to define a chamber 26.

The basin 23 is relatively shallow and wide and is defined by an end wall 27, a dividing wall 28, a flat bottom wall 29 and inclined side walls 31 and 32. The end and side walls are inclined and the dividing wall has a longitudinal section in the form of a trapezoid with its smaller side uppermost. The dividing wall extends to a level slightly above the axis of the shell 12 and of the furnace. The end wall and the side walls extend to a common level well above the axis. The basin 24 is defined by the dividing wall 28, a dividing wall 33, a flat horizontal bottom wall 34 and side walls 35. The upper surface of the bottom wall 34 lies a considerable distance below the level of the bottom wall 29, while the side walls 35 extend to the same level as the walls 31 and 32. As has been stated, the dividing wall 28 extends to a height slightly above the axis of the furnace, while the dividing wall 33 reaches a height slightly below the axis. The dividing wall 33 is also trapezoidal in cross-section. Basin 25 is defined by the dividing wall 33, an end wall 36, a flat bottom wall 37 and side walls 38. The bottom wall is located a considerable distance below the level of the bottom wall 34 of the basin 24. The end wall 36 and the side walls extend upwardly to the same height as the side walls 31, 32 and 35. Lying on the top edges of the said side walls are a number of interlocked graphite slabs 39 forming a horizontal roof member 41. The exposed surface of the basin member 22 and the lower surface of the roof member 41 serve to define a work chamber 42; it should be noted that the walls of the chamber 42 are entirely formed of aluminum nitride with the exception of that portion supplied by the roof member 41.

An upper chamber 43 is defined by the upper surface of the roof member 41 and the exposed inner surface 21 of the layer 19. Situated in this chamber are electrical heating elements 44, 45 and 46 located above the centers of the basins 23, 24 and 25, respectively. Each of these heating elements consists of a pin of graphite which constitute resistance elements. As is evident in Figure 2, the heating element 44, which is representative of the other heating elements, extends transversely across the chamber 43 in cantilever fashion from a horizontal aperture 47 extending through the wall of the furnace. A supporting tube 48 is welded to the shell 12 and provided with a sealing chamber 49. Electrical leads 51 and 52 enter the furnace through the closure and are connected to the resistance element in the heating element. The leads are also connected through an adjustable resistor 60 to a source of electrical power. The resistances of the three heating elements are selected at different values and each heating element has its own set of electrical leads and adjustable resistor so that the temperature over each basin can be carefully regulated.

Extending through the furnace wall from the lower part of the basin 23 is a tapping passage 53, which has a relatively small opening into the basin. The opening is closed by a plug 54 of refractory cement during normal operation of the apparatus. The portion of the passage which passes through the lining of insulating brick 17 is provided with a graphite sleeve 55; this sleeve protrudes from the furnace and acts as a spout, there being a closure 56 over its open outer end during normal operation of the apparatus. A similar passage 57 is associated with the basin 24 and a passage 58 with the basin 25. Opening into the end of the chamber 42 over the end wall 27 of the basin 23 is a charging entrance passage 59 extending entirely through the furnace end and inclining inwardly and downwardly. A graphite sleeve 61 fits tightly in the passage and protrudes from each end thereof to form a spout at the inner end overlying the basin 23 and a spout at the outer end for the introduction of the raw material of the process. A closure 62 seals the outer end of the sleeve during normal operation of the apparatus.

At the end of the furnace opposite the charging passage 59 is a cooling chamber 63 formed in the insulating brick 17; the chamber is of generally cylindrical configuration and is coaxial with the furnace. The chamber 63 is joined to the chamber 42 by a horizontal passage 64 passing through the layer 19 in such a manner that rather more of the passage resides above the furnace axis than lies below it. The passage 64 is of generally rectangular cross-section and extends from side to side of the chamber 63. A slab 65 of aluminum nitride is fastened to the lower horizontal surface of the passage and extends into the chamber 42 a considerable distance; the inner end overlies the basin 25 of the level of the furnace axis for a distance approximately a third of the distance from the end wall 36 to the dividing wall 33. Lying in the chamber 63 centrally thereof is a cooling element 66 consisting of a hollow, closed tube 67 which passes through the transverse member 16 and is fixed thereto by welding or the like. The tube is provided with transverse fins 68 which permit the absorption of heat from the end wall 36 of the basin 25 by radiation. A tube 69 extends into the tube 67 and is connected to a source of cold refrigerant, not shown. Extending through the transverse member 16 is an evacuating passage 71 from which extends a conduit 72 which is connected to a vacuum pump 73, shown schematically.

An example of an apparatus actually built according to the teachings of the invention will now be described. The apparatus, of which the drawings are a representation drawn to scale, had a furnace with an overall length of 2.6 meters and a diameter of 1.5 meters. The center of the outer end of the sleeve 61 was located 180 mm. above the axis of the furnace and the inclination of the sleeve and passage was such that the centerline intersected the furnace axis above the middle of the basin 23. The end wall 27 was 75 mm. thick at its intersection with the bottom wall 29, the bottom wall was 430 mm. long in the direction of the furnace axis and 600 mm. wide in the transverse direction. The side walls 31 and 32 sloped upwardly and outwardly to give the basin 23 a width of 710 mm. at the upper edge where they contacted and supported the roof member 41. The distance from the bottom wall 29 to the roof member was 210 mm. The upper edge of the dividing wall 28 was located 80 mm. from the lower surface of the roof member and there was a horizontal distance of 150 mm. between the intersection of its entrance slope in the basin 23 with the bottom wall 29 and the intersection of its exit slope in the basin 24 with the bottom wall 34. The bottom wall 34 was located 240 mm. below the furnace axis. The width of the basin 24 was the same as basin 23, at the top where the side walls 35 contact the roof member and the slope of the walls was the same as in the basin 23, so, naturally, the width of the bottom wall 34 was less than that of the bottom wall 29 because of the greater depth. The dimension of the bottom wall 34 in the direction of the furnace axis was 360 mm. The upper edge of the dividing wall 33 was 150 mm. below the roof member and a horizontal dimension of 170 mm. existed between the intersection of the entrance slope in the basin 24 with the bottom wall 34 and the intersection of the exit slope in the basin 25 with the bottom wall 37. The bottom wall 37 resided at a level 340 mm. below the furnace axis and the bottom wall was 230 mm. long in the direction of the axis. The side walls 38 of the basin 25 were coplanar with the corresponding walls of the basins 23 and 24; the dimension at the upper edges was, therefore, the same and the slopes were the same. However, because of the greater depth of the basin 25, the transverse dimension of the bottom wall 37 was considerably less than that of the other two bottom walls. The end wall 36 had a thickness of 105 mm. at its junction with the bottom wall and it terminated at the level of the lower surface of the passage 64 which level was located 150 mm. from the roof member 41. All bottom walls were 80 mm. thick and the layer 19 under each bottom wall was 120 mm. thick. The slab 65 was 75 mm. thick and 400 mm. long.

The upper chamber 43 was 1520 mm. long and, midway between the sides, was 175 mm. high. The roof member 41 was 40 mm. thick and the heating elements were located 50 mm. above it. The heating elements were all 25 mm. thick and were located over the centers of their respective basins. The roof of the chamber 43, which was the exposed surface of the layer 19 was formed with a semi-cylindrical form, the axis of which was parallel to the furnace axis and the radius of which was approximately 1000 mm.

The operation of the apparatus will now be readily understood in view of the above description; the operation will be described as it was carried out in the case of the specific example described above. Electrical current was introduced independently into the heating elements to warm up the furnace. The heating element 44 was adjusted to use approximately 15 kw. of power and it reached a temperature of about 1450° C.; the element 45 used 12 kw. and had a temperature of 1350° C.; and the element 46 required 9 kw. and had a temperature of 1200° C. The cooling element 66 was provided with a flowing coolant, so that it maintained the temperature of the end wall 36 well below 1200° C. After the furnace elements had reached their final temperatures, 50 kg. of alloy was introduced into the basin 23 through the sleeve 61; the closure 62 was then replaced. The alloy was introduced in liquid form and consisted of approximately 25 litres; it rose to a level of 100 mm. above the bottom wall of the basin. The alloy contained 14.3% silicon, 1.3% iron and the rest aluminum. Then, the vacuum pump 73 was actuated to produce in the chamber 63 a vacuum of from 0.1 to 0.2 mm. of mercury. After the temperatures in the furnace had reached a steady state, the temperature in the basin 23 was 1450° C., in the basin 24 it was 1350° C. and in the basin 25 it was 1200° C. The upper part of the dividing wall 28 was at a temperature of 1380° C., while the dividing wall 33 was at 1250° C., the slab 65 was at about 1200° C., and, as has been stated, the end wall 36 was at a temperature considerably below 1200° C. The vapor pressure of aluminum at the temperature of basin 23 is 1.0 mm. Hg, while it is 0.3 mm. Hg at the temperature of basin 24 and 0.02 mm. Hg at the temperature of basin 25. The operation was continued for 12 hours, at which time about 90% of the starting material had been transferred from basin 23 to basins 24 and 25. At that time, about 40 kg. of aluminum of a purity of 99.6% to 99.7% had collected in basin 24, while about 10 kg. of a ferro-silicon-aluminum alloy, of more than 70% silicon, remained in the other two basins. The vacuum was removed from the chamber and the fractions were drained from the basins through the tap passages corresponding to the tap passage 53 associated with basin 23.

Observations of the process indicated that, when the alloy in basin 23 reached the temperature of about 1450° C., the metal started to evaporate and tended to float toward the other end of the furnace due to the drop in pressure and slight flow of gas along its length. This drop in pressure is, of course, because the pump is working at that end. The vapor particles of aluminum were very slow-moving and were not readily moved in this manner. The vapor impinged and condensed on the entrance side of the dividing wall 28; the liquid metal thus deposited "climbed" up this side of the wall and flowed down the other side into the basin 24. The silicon content of the metal in basin 24 remained below 3% as long as the basin 23 was only 90% emptied. The metal which collected in the basin 24 did not distill as rapidly as that in basin 24, since its temperature is only 1350° C., but it did distill slowly. The vapor condensed on the entrance side of the dividing wall 33 and "climbed" over into the basin 25, where the silicon content was well below 1%. The temperature in the basin 25, which served as a collector vessel for the purified aluminum, was maintained at 1200° C., at which temperature the vapor tension of aluminum was very low. The metal was then stabilized in the liquid state by the pressure prevailing within the furnace chamber. The cold end wall 36 became covered with solid metal which fluidized and flowed back into the basin 25 as soon as the surface temperature was the same as for the triple point. With regard to the phenomenon of "climbing," a theory has been advanced that it takes place because of successive distillations and condensations at locations very close to one another. If, in the course of the distillation process, the apparatus were suddenly cooled, one would find a layer of aluminum on the surfaces of the dividing walls 28 and 33, as if the metal had climbed the walls before running into the following basin. This, apparently, is a characteristic of aluminum but not of such substances as zinc or magnesium, for example. It will be understood that the progress of the process described above depends on small gradients of temperature and pressure and that the formation of volatile substances by the interaction of molten aluminum with the walls of the apparatus would cause fluctuations in pressure that would make the process unworkable; for that reason, if for no other, the material of which the apparatus is constructed becomes very important.

As a second example of the operation of the invention, an alloy was used having a composition of 34.5% silicon, 6.5% iron, 2.2% titanium and the remainder aluminum. This alloy was subjected to a preliminary segregation and an eutectic was obtained having an analysis of 14.3% silicon, 1.3% iron, 0.2% titanium. Upon distillation under the conditions described above in the first example, the product which appeared in basin 24 had a silicon content below 2.8% and an iron content of 0.1%. The final product obtained in basin 25 had a content of 0.24% silicon, 0.04% iron, 0.05% titanium and 99.67% aluminum.

As a third example, a series of experiments were performed on an alloy having a high iron content. Silicon and aluminum do not react chemically to give a product different from the respective reactants and, therefore, such an alloy does not present the difficulties that would otherwise present themselves. However, when iron is present with silicon and aluminum, it might be supposed that products or compounds would be formed that would not be dissociated under the temperatures and pressure conditions used. This fear did not prove to be justified, as will be evident. The alloy used contained 12.3% silicon, 20% iron and 67.7% aluminum. A single distillation step was performed in a simple apparatus prepared especially for the experiments, with the result shown in the following chart:

| Test No. | Temperature, Degrees C. | Vacuum, mm. Hg | Content of Condensate Metal | | Percent of Original Metal Carried Over |
| --- | --- | --- | --- | --- | --- |
| | | | Percent Fe | Percent Si | |
| 1 | 1,470 | 1.0 | 0.65 | 0.62 | 47.5 |
| 2 | 1,470 | 0.5 | 1.07 | 0.82 | 65.0 |
| 3 | 1,470 | 0.1 | 1.54 | 0.53 | 68.5 |

It can be seen, then, that, at the temperatures selected, combinations of iron with aluminum are practically dissociated, the behavior of the liquid alloy upon distillation being the same as for a simple mixture. In practice, when distilling alloys containing combinations of large percentages of iron with aluminum, it has been found advisable to operate at a temperature higher than 1400° C., since aluminum distills too slowly below that temperature. A comparison of the second and third examples indicates that the presence of high percentages of iron tends to retain the silicon in the state of an iron-silicon compound, thus preventing its being distilled as readily.

As a fourth example, a series of experiments were performed to show the relative effect of molten aluminum on various substances. For the purpose of these experiments a charge of 30 grams of aluminum was melted in crucibles formed of various materials, provision being made to place the crucibles under a vacuum for a fixed length of time. The temperature was raised evenly at the rate of 50° C. in each ten minutes to a temperature of 1450° C. The loss in weight of the crucible or, in some cases, of grains of the material gave an indication, in every case, of the speed of deterioration of the material in the presence of molten aluminum. The following table gives the results of the tests:

| Experiment No. | Material | Original Weight of Crucible, grams | Final Weight of Crucible, grams | Percent Deterioration |
| --- | --- | --- | --- | --- |
| 1 | Al 90 | 284 | 116 | 59 |
| 2 | Sintered alumina | 60 | 30 | 50 |
| 3 | Beryllium oxide | 93 | 16 | 83 |
| 5 | Artificial sapphire | 5.5 | 3.85 | 70 |
| 6 | Mullite | 4.87 | 2.16 | 46 |
| 7 | Silicon carbide | 2.67 | 0.07 | 2.6 |
| 8 | Aluminum nitride (1,480° C.). | 38.5 | 38.5 | 0 |
| 9 | Aluminum nitride (1,500° C.). | 38.5 | 38.5 | 0 |
| 10 | Aluminum nitride (1,460° C.). | 38.5 | 38.0 | 1.3 |
| 11 | Aluminum nitride (1,520° C.). | 63.5 | 63.2 | 0.5 |
| 12 | Aluminum nitride (1,450° C.). | 63.5 | 63.5 | 0 |
| 13 | Aluminum nitride (1,460° C.). | 63.5 | 63.2 | 0.5 |

The crucible used in experiments No. 11, 12 and 13 was used in 36 heatings with a loss of only 7 grams, after having treated 1100 grams of aluminum. Seven heatings under these same conditions with an aluminum nitride crucible whose starting weight was 73.5 grams brought about a loss of only 7 grams with an aluminum-iron alloy; a considerable amount of this loss was due to the mechanical effect such as scratching, etc., that occurred during removal of the alloy from the crucible. Graphite proved to deteriorate rapidly at 1300° C. in vacuum when brought into contact with molten aluminum.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

The invention having been thus described, what is claimed as new and desired to secure by Letters Patent is:

1. An apparatus for separating aluminum from its alloys comprising walls defining a chamber which is elongated in a generally horizontal direction, the walls of the chamber being formed from a substance selected from the class consisting of aluminum carbide, aluminum nitride and silicon carbide, a plurality of transverse dividing walls, means associated with the chamber for producing a high vacuum therein, and heating means arranged to obtain a temperature gradient from one end to the other.

2. Apparatus for separating aluminum from its alloys comprising a basin member formed of a substance selected from the class consisting of aluminum nitride and aluminum carbide, a roof member formed of graphite, the basin member and the roof member defining a horizontally-elongated chamber, a charging entrance at one end of the chamber, a cooling means at the other end of the chamber, an evacuating means connected to the chamber at the said other end for subjecting the chamber to a high vacuum, dividing walls extending transversely across the chamber and extending vertically upwardly from the basin member to define a plurality of basins, and a heating element overlying each basin and located over the roof member.

3. Apparatus for separating aluminum from its alloys comprising a basin member formed of a substance selected from the class consisting of aluminum nitride and aluminum carbide, a roof member, the basin member and the roof member defining and totally enclosing a horizontally-elongated chamber, a charging entrance at one end of the chamber, a closure normally covering the said entrance, a cooling means at the other end of the chamber, an evacuating means connected to the chamber at the said other end, dividing walls extending transversely across the chamber and extending vertically upwardly from the basin member to define a plurality of basins, a tapping passage extending outwardly of the basin member from the lower part of each basin, and a heating element overlying each basin and located over the roof member.

4. Apparatus for separating aluminum from its alloys comprising a basin member formed of a substance selected from the class consisting of aluminum nitride and aluminum carbide, a horizontal roof member formed of graphite overlying the basin member, the basin member and the roof member defining a horizontally-elongated chamber, a charging entrance at one end of the chamber, a cooling means at the other end of the chamber, an evacuating means connected to the chamber at the said other end, dividing walls extending transversely across the chamber and extending vertically upwardly from the basin member to define a plurality of basins, each successive basin from the said one end to the said other end of the chamber having its bottom further spaced from the roof member than the preceding basin and a heating element overlying each basin and located over the roof member.

5. Apparatus for separating aluminum from its alloys comprising a basin member formed of a substance selected from the class consisting of aluminum nitride and aluminum carbide, a roof member formed of graphite, the basin member and the roof member defining a horizontally-elongated chamber, a charging entrance at one end of the chamber, a cooling means at the other end of the chamber, an evacuating means connected to the chamber at the said other end, dividing walls extending transversely across the chamber and extending vertically upwardly from the basin member to define a plurality of basins, each dividing wall having a generally trapezoidal cross-sectional shape in a vertical longitudinal plane, and a heating element overlying each basin and located over the roof member.

6. Apparatus for separating aluminum from its alloys comprising a basin member formed of a substance selected from the class consisting of aluminum nitride and aluminum carbide, a roof member formed of graphite, the basin member and the roof member defining a horizontally-elongated chamber, a charging entrance at one end of the chamber, a cooling means at the other end of the chamber, an evacuating means connected to the chamber at the said other end, dividing walls extending transversely across the chamber and extending vertically upwardly from the basin member to define a plurality of basins, an electrical resistance-type heating element overlying each basin and located over the roof member, and means independently controlling the amount of heating accomplished by each heating element.

7. Apparatus for separating aluminum from its alloys comprising a basin member formed of a substance selected from the class consisting of aluminum nitride and aluminum carbide, a horizontal roof member formed of graphite overlying the basin member, the basin member and the roof member defining and totally enclosing a horizontally-elongated chamber, a charging entrance at one end of the chamber, a closure normally covering the said entrance, a cooling means at the other end of the chamber, an evacuating means connected to the chamber at the said other end, dividing walls extending transversely across the chamber and extending vertically upwardly from the basin member to define a plurality of basins, a tapping passage extending outwardly of the basin member from the lower part of each basin, each successive basin from the said one end to the said other end of the chamber having its bottom further spaced from the roof member than the preceding basin, each dividing wall having a generally trapezoidal cross-sectional shape in a vertical longitudinal plane, an electrical resistance-type element overlying each basin and located over the roof member, and means independently controlling the amount of heating accomplished by each heating element.

References Cited in the file of this patent

UNITED STATES PATENTS

| | | |
|---|---|---|
| 2,294,546 | Gentil | Sept. 1, 1942 |
| 2,552,648 | Poland | May 15, 1951 |
| 2,680,144 | Wilkins et al. | June 1, 1954 |
| 2,716,790 | Brennan | Sept. 6, 1955 |

FOREIGN PATENTS

| | | |
|---|---|---|
| 477,720 | Great Britain | Jan. 5, 1938 |
| 156,854 | Australia | June 3, 1954 |
| 718,800 | Great Britain | Nov. 17, 1954 |